United States Patent
Lopez et al.

(10) Patent No.: US 7,170,766 B2
(45) Date of Patent: Jan. 30, 2007

(54) HIGH POWER SWITCHING CONVERTER

(75) Inventors: Raul Baruque Lopez, Madrid (ES); Jaime De La Pena Llerandi, Madrid (ES); Jesus Angel Oliver Ramirez, Madrid (ES); Oscar Garcia Suarez, Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/969,997

(22) Filed: Oct. 22, 2004

(65) Prior Publication Data

US 2005/0088865 A1   Apr. 28, 2005

(30) Foreign Application Priority Data

Oct. 24, 2003   (EP)   ................................. 03292657

(51) Int. Cl.
   *H02M 1/10*   (2006.01)
(52) U.S. Cl. ................... 363/65; 363/16; 323/222; 323/224
(58) Field of Classification Search ............ 363/15–20, 363/27, 28, 71, 95, 68, 96–98; 323/222, 323/224, 282–288
See application file for complete search history.

(56) References Cited

U.S. PATENT DOCUMENTS

| | | | |
|---|---|---|---|
| 4,801,859 A | * | 1/1989 | Dishner ....................... 323/224 |
| 5,208,740 A | * | 5/1993 | Ehsani ........................ 363/124 |
| 5,847,942 A | | 12/1998 | Bazinet et al. |
| 6,038,142 A | | 3/2000 | Fraidlin et al. |
| 2002/0159280 A1 | | 10/2002 | Lai |
| 2003/0002304 A1 | | 1/2003 | Lai |

OTHER PUBLICATIONS

Lizhi Zhu et al, "New Start-up Schemes for Isolated Full-Bridge Boost Converters", IEEE Transactions on Power Electronics, vol. 18, No. 4, Jul. 4, 2003, pp. 946-951, XP002276356.
Patent Abstracts of Japan. vol. 2000, No. 26, Jul. 1, 2002 corresponding to JP 2001 268900 A dated Sep. 28, 2001.
K. Wang et al, "Bi-directional DC to DC converters for fuel cell systems", Power Electronics in Transportation, 1998, Dearborn, MI, USA, Oct. 22-23, NY, NY, pp. 47-51, XP010313443.
Lizhi Zhu et al, "New Start-up Schemes for Isolated Full-Bridge Boost Converters", IEEE Transactions on Power Electronics, vol. 18, No. 4, Jul. 4, 2003, pp. 946-951, XP002276356.
Patent Abstracts of Japan, vol. 2000, No. 26, Jul. 1, 2002 corresponding to JP 2001 268900 A dated Sep. 28, 2001.
K. Wang et al, "Bi-directional DC to DC converters for fuel cell systems", Power Electronics in Transportation, 1998, Dearborn, MI, USA, Oct. 22-23, 1998, NY, NY, pp. 47-51, XP010313443.

* cited by examiner

*Primary Examiner*—Rajnikant B. Patel
(74) *Attorney, Agent, or Firm*—Sughrue Mion, PLLC

(57) ABSTRACT

A high power isolated switching converter is provided, comprising a first power (11) stage and second power (12) stage connected in cascade such that the second power (12) stage is by-passed during part of a start-up mode.

15 Claims, 1 Drawing Sheet

HIGH POWER SWITCHING CONVERTER

OBJECT OF THE INVENTION

This application is based on and claims the benefit of European Patent Application No. EP03292657.8 filed Oct. 24, 2003, which is incorporated by reference herein.

The present invention refers to a high power switching power supply which can be used for integration of an electricity distribution system into an automobile vehicle powered by internal combustion engines and electric motors.

STATE OF THE ART

The electrical architectures for new electric vehicles require two voltage buses of different nominal voltage value, for example 12V for powering lamps, electronic control units, etc, and 300V for powering an electric motor used as an auxiliary torque to the main engine.

This 300V bus voltage may be connected to a supercapacitor, battery or energy storage element as an energy buffer to the input of the electric motor. The electric vehicle requires a bi-directional DC/DC converter due to the energy needing to be transferred bi-directionally between the two voltage buses. During start-up, for example, the energy is supplied by the low voltage battery and transferred to the high-voltage bus, while at other moments, for example when braking, the energy of the motor is transferred to the 12V battery for recovery.

A bi-directional DC/DC converter is known from U.S. Pat. No. 6,587,356 B2, which is incorporated herein by reference. This bi-directional DC/DC converter discloses a high power isolated full-bridge boost DC/DC converter with an additional start-up circuit for establishing an initial output voltage before the converter operates in its normal boost mode.

The start-up circuit has a start-up fly-back winding which is coupled to the input boost choke, a diode and a capacitor as an output capacitor. This auxiliary circuit is coupled in parallel to the output of the secondary side of the full-bridge DC/DC converter. This auxiliary converter is used for the pre-charge of the output, e.g. capacitor, battery, because otherwise it would be impossible to start through the main power stage.

The reason is the absence of a proper duty cycle in this type of topologies that would fix the output voltage below the reflected input voltage (the input voltage multiplied by the turns ratio of the transformer, 12V*n in this case, being "n" the turns ratio). The same would occur for any other input voltage (42V, 24V, for example).

Another disadvantage of the full-bridge DC/DC converter is that the auxiliary converter cannot provide the full rated power during this initial period of time unless properly sized, but this would increase the size of the global converter. In this case, the auxiliary flyback output increases the output voltage up to a predetermined value (approximately 12V*n) and being disconnected after this instant and starting the operation of the main full-bridge converter.

In addition, the full-bridge DC/DC converter has disadvantages such as a clamping circuit must be added to avoid the voltage spikes at the fly-back winding and the boost choke.

Accordingly, it becomes necessary to propose a bi-directional DC/DC converter which utilizes a reduced number of electronic components such as switches, capacitors or similar, avoiding the spikes during operation and able to provide any output voltage between 0V and the nominal output voltage. Furthermore, the bi-directional DC/DC converter should be reduced in cost and size and of high yield.

CHARACTERISATION OF THE INVENTION

To solve the problems described above a high power switching converter is provided, comprising a first power stage and a second power stage connected in cascade such that the second power stage is connectable to a high voltage bus, capacitor or to an electric motor.

The second power stage includes a first switching element which is held ON during part of a start-up period and a second switching element is held OFF during the same part of the start-up period until the output voltage achieves a predetermined voltage threshold. Once the threshold value is achieved, the first power stage is held constant in line with a predetermined duty cycle whereas the second power stage is switched such that the intended output voltage is achieved.

An object of the present invention is to provide a switching power converter which supplies the full rated power even during the start-up period, and every state of the switching converter is driven properly.

Another object of the present invention is obtained, namely a good losses distribution and optimum yield in the rectification stage because it is operating in accord with 50% duty cycle.

BRIEF EXPLANATION OF THE FIGURES

A more detailed explanation of the invention is given in the following description based on the attached figures in which.

DESCRIPTION OF THE INVENTION

Figure 1:
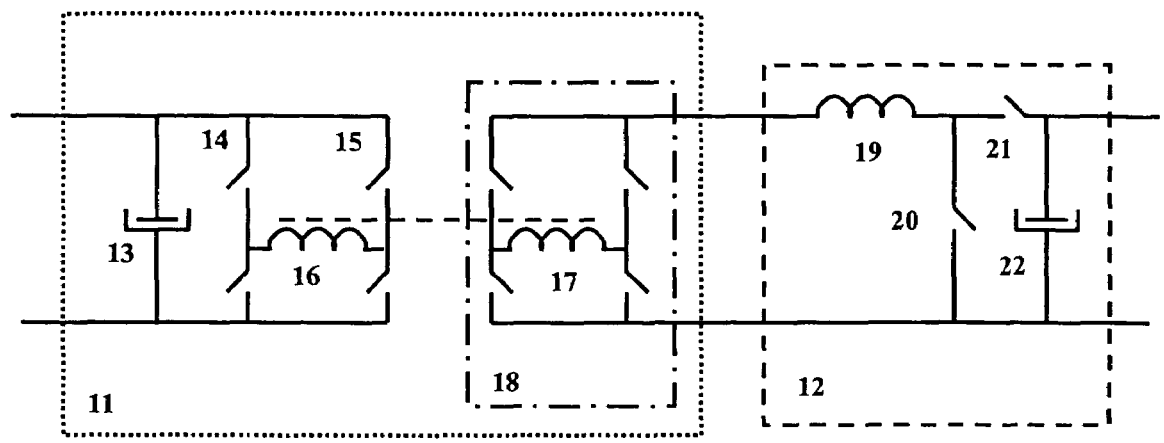
FIG. 1 represents in a block diagram a high power isolated switching converter according to the invention.

FIG. 1 represents a bi-directional switching power supply including a first isolated full-bridge DC/DC converter stage 11 and a second DC/DC buck cell type converter stage 12, two-stage cascade connected, for generating an output voltage in response to an input voltage and current.

The first power stage 11 is connected to a first voltage source which voltage value, e.g. 12V, is lower than the voltage value, e.g. 300V, of a second voltage source which is coupled to the second power stage 12.

For the description, a full-bridge topology with full wave rectification in the secondary side is considered only for explanation. However, other topologies with or without isolating may also be suitable for achieving the present invention, such as push-pull, half-bridge, or similar; as well as rectification stages (full-wave rectification vs half-wave rectification).

The first power stage 11 has a first capacitor 13 connected in parallel to a leg 14 of the full-bridge which has four switches, a transformer 16, 17 means having a primary winding 16 being connected between two legs 14, 15 of the full-bridge, a secondary winding 17 being coupled between two legs of a rectifier 18 means which has four switches too.

A first end of an inductor 19 of the second power stage is connected in series to a node of the rectifier 18. A second end of the inductor 19 is connected both in series to a first terminal of a first switching 21 element as well as in parallel to the first terminal of a second switching 20 element, namely, freewheeling switch. A second terminal of the first switch 21 is connected in parallel to an end of a second capacitor 22 which provides an output voltage.

It should be observed that each switch could be a field effect transistor MOSFET, IGBTs or other type of silicon switches, respectively.

The primary switches of the full-bridge 11 switched by means of a first PWM module such that they are respectively alternately turned on and off, and the buck cell 12 switches are driven by means of a second PWM module, such that they are respectively alternately turned on and off too.

The PWMs controller provides a duty cycle according to a predetermined timing sequence, with proper synchronization. For example, during normal boost mode operation (12V=>300V) the duty cycle of the first stage 11 is ideally held constant at fifty percent and the duty cycle of the second stage 12 is adapted to keep the output voltage regulated.

Similarly, when the converter is working in buck mode (300V=>12V), the first stage 11 is also operating at 50% duty cycle, and the second stage 12 uses its duty cycle to regulate the output voltage.

Obviously, during normal operation of the bi-directional switching power supply, the switches of the second power stage 12 are turned on and off according to a predetermined timing sequence for providing the intended output voltage.

Figure 2:
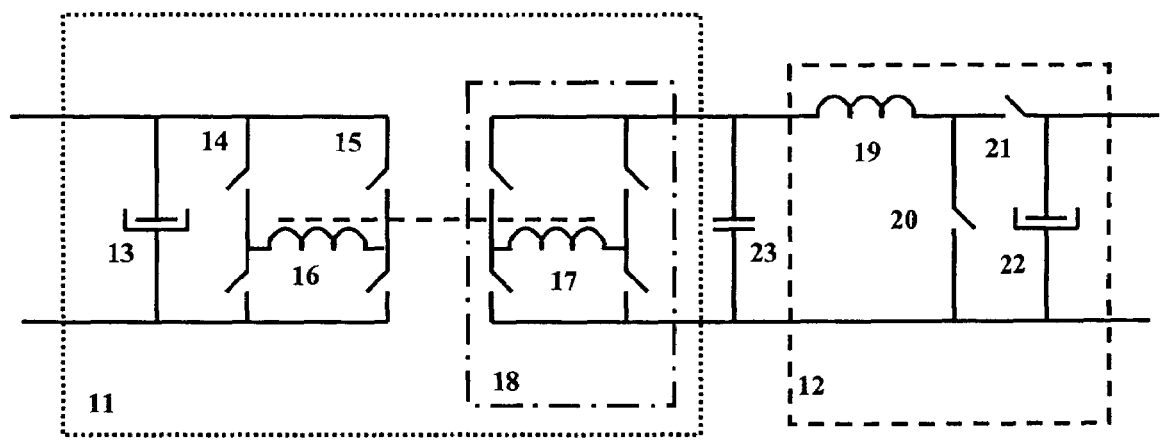
FIG. 2 represents in a block diagram a high power isolated switching converter having a capacitor connected to a buck type cell according to the invention.

It should be highlighted that there may be some overlapping in the control pulses of the rectification stage 18, that is, secondary side but these are not possible in the primary side of the full-bridge converter because then a short-circuit at the input would occur. When there is no overlapping in the control pulses it is necessary to include a third capacitor 23 between both the first 11 and second 12 power stages, as illustrated in FIG. 2.

Turning now to FIG. 1, detailed operation under normal conditions will not be explained, inasmuch as known to those skilled in the art.

The bidirectional switching power supply provides a start-up scheme for the converter working in boost mode. This start-up scheme uses only the first power stage 11, that is, the second PWM controller generates control signals which are inputted to control terminals of the first 21 and second 20 switches of the second power stage 12 so that the first switch 21 will remain in switched-ON conduction state, and the freewheeling switch 20 will remain in switched-OFF non-conduction state, until the output voltage of the switching power converter achieves a predetermined threshold output voltage. It should be observed that the threshold is lower than the intended output voltage, e.g. 300V.

Once the output voltage is equal to the threshold output voltage, the switches 20, 21 of the second power 12 stage are controlled such that they are respectively alternately turned on and off for obtaining the intended regulated output voltage, and the full-bridge switches are permanently set respectively at 50% of the duty cycle.

In addition, during a part of the start-up period the bi-directional switching power supply operates as only a single power stage due to the second power 12 stage being by-passed, hence non-operating. During the remaining of the start-up period the first power 11 stage is operating at 50% of its duty cycle and the second power 12 stage is switching to obtain the intended regulated output voltage.

The invention claimed is:

1. A bidirectional DC/DC power switching converter comprising a first power stage connected in cascade to a second power stage such that the first power stage is connectable to a first voltage source which voltage level is lower than the voltage value of a second voltage source which is connectable to the second power stage; characterised in that during part of a start-up mode, the second power stage is non operating until the output voltage is higher than a predetermined threshold which is lower than the voltage value of the second voltage source.

2. A bidirectional DC/DC power switching converter according to claim 1; wherein the first power stage is held constant in line with a predetermined duty cycle whereas the second power stage is switched such the intended output voltage that is achieved during the remaining start-up mode.

3. A bidirectional DC/DC power switching converter according to claim 2; wherein the first power stage and the second power stage are bi-directional switching power converter.

4. A bidirectional DC/DC power switching converter according to claim 3; wherein the first power stage includes a transformer means.

5. A bidirectional DC/DC power switching converter according to claim 4; wherein the first power stage being a full-bridge topology including a full-wave or half-wave rectification means.

6. A bidirectional DC/DC power switching converter according to claim 4; wherein the first power stage is a half-bridge topology comprising a full-wave or half-wave rectification means.

7. A bidirectional DC/DC power switching converter according to claim 4; wherein the first power stage is a push-pull topology including a full-wave or half-wave rectification means.

8. A bidirectional DC/DC power switching converter according to claim 3; wherein the second power stage is a buck type cell.

9. A bidirectional DC/DC power switching converter according to claim 8; including a third capacitor coupled in parallel between the first and second power stages.

10. A bidirectional DC/DC power switching converter according to claim 9; wherein the rectification means switches such that its switching elements have short overlapping periods for avoiding use of the third capacitor.

11. A bidirectional DC/DC power isolated switching converter according to claim 8; wherein the bi-directional buck cell is connectable to an electric motor.

12. A bidirectional DC/DC power isolated switching converter according to claim 8; wherein the full-bridge converter is held constant at fifty percent whereas the second power stage keeps the output voltage regulated.

13. A DC/DC power switching converter according to claim 1, wherein said second power stage comprises switches switchable at a first duty cycle for maintaining a desired second stage output voltage, a conduction state of said switches being controlled at something other than said first duty cycle during part of a start-up mode of said converter until the second stage output voltage is higher than a predetermined threshold which is lower than the voltage value of the second voltage source.

14. A DC/DC power switching converter according to claim 1, wherein said switches are maintained in a constant conduction state during said part of said start-up mode until said predetermined threshold voltage is reached.

15. A DC/DC power switching converter comprising a first power stage connected in cascade to a second power stage such that the first power stage is connectable to a first voltage source which voltage level is lower than the voltage value of a second voltage source which is connectable to the second power stage, said second power stage having switches switchable at a duty cycle for maintaining a desired second stage output voltage, said switches being held in a constant state during part of a start-up mode of said converter until the second stage output voltage is higher than a predetermined threshold which is lower than the voltage value of the second voltage source.

* * * * *